US012416324B2

(12) United States Patent
Spies et al.

(10) Patent No.: US 12,416,324 B2
(45) Date of Patent: Sep. 16, 2025

(54) ANCHORING UNIT, METHOD FOR FASTENING A SYSTEM TO AN ANCHORING UNIT, AND SYSTEM UNIT WITH ANCHORING UNIT

(71) Applicant: Siemens Energy Global GmbH & Co. KG, Bayern (DE)

(72) Inventors: Alexander Spies, Kemnath (DE); Roland Plobner, Bayern (DE); Peter Utz, Nuremberg (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 826 days.

(21) Appl. No.: 17/762,054

(22) PCT Filed: Sep. 7, 2020

(86) PCT No.: PCT/EP2020/074925
§ 371 (c)(1),
(2) Date: Mar. 19, 2022

(87) PCT Pub. No.: WO2021/063633
PCT Pub. Date: Apr. 8, 2021

(65) Prior Publication Data
US 2022/0373008 A1 Nov. 24, 2022

(30) Foreign Application Priority Data
Oct. 2, 2019 (EP) .................................... 19201068

(51) Int. Cl.
*F16B 5/02* (2006.01)
*F16B 5/06* (2006.01)
*F16B 43/00* (2006.01)

(52) U.S. Cl.
CPC .............. *F16B 5/02* (2013.01); *F16B 5/0621* (2013.01); *F16B 43/001* (2013.01)

(58) Field of Classification Search
CPC .......... F16B 5/02; F16B 5/0621; F16B 43/001
(Continued)

(56) References Cited

U.S. PATENT DOCUMENTS

| 4,049,304 A | 9/1977 | Imhoff |
| 4,970,761 A | 11/1990 | Nakamura |

(Continued)

FOREIGN PATENT DOCUMENTS

| CN | 201858224 U | 6/2011 |
| CN | 102792034 A | 11/2012 |

(Continued)

OTHER PUBLICATIONS

PCT International Search Report and Written Opinion of International Searching Authority mailed Dec. 3, 2020 corresponding to PCT International Application No. PCT/EP2020/074925 filed Sep. 7, 2020.

(Continued)

*Primary Examiner* — Anita M King
(74) *Attorney, Agent, or Firm* — Wolter Van Dyke Davis, PLLC

(57) ABSTRACT

An anchoring unit for a system, the anchoring unit having at least one first insulation layer and at least one second insulation layer. The anchoring unit furthermore includes a support layer for mechanically stabilising the insulation layers, the support layer being arranged between the first insulation layer and second insulation layer. The anchoring unit furthermore includes at least two screws, the screws being oriented in opposition to one another, a first screw being suitable for anchoring to the system and a second screw being suitable for anchoring to an anchor object. A first screw head of the first screw is in direct contact with the support layer. A screw shank of the first screw is arranged at (Continued)

least partially in the first insulation layer. A method includes fastening a system to the anchoring unit.

13 Claims, 2 Drawing Sheets

(58) Field of Classification Search
USPC ....................................................... 248/217.4
See application file for complete search history.

(56) References Cited

U.S. PATENT DOCUMENTS

| 10,418,726 B2* | 9/2019 | Yukawa ................. H01R 12/51 |
| 2003/0183045 A1 | 10/2003 | Junkers |
| 2012/0308330 A1* | 12/2012 | Hohmann, Jr. ....... E04B 1/4178 |
| | | 411/387.1 |
| 2013/0120915 A1 | 5/2013 | Eichner |
| 2018/0342974 A1 | 11/2018 | Jasmin et al. |

FOREIGN PATENT DOCUMENTS

| CN | 202887886 U | 4/2013 |
| CN | 206145315 U | 5/2017 |
| CN | 107002728 A | 8/2017 |
| CN | 108691870 A | 10/2018 |
| CN | 108730307 A | 11/2018 |
| CN | 208242101 U | 12/2018 |
| DE | 1819064 U | 10/1960 |
| EP | 0569801 A1 | 11/1993 |
| EP | 2278173 A2 | 1/2011 |
| EP | 3464013 A1 | 4/2019 |
| FR | 2652136 A1 | 3/1991 |
| GB | 2431213 A | 4/2007 |
| KR | 101962953 B1 | 3/2019 |

OTHER PUBLICATIONS

Xue, W., Flat Screen Screen Box—Steel Frame Fasteners Review, Flour Newsletter Flour Milling, 2006, pp. 25-28.

* cited by examiner

ANCHORING UNIT, METHOD FOR FASTENING A SYSTEM TO AN ANCHORING UNIT, AND SYSTEM UNIT WITH ANCHORING UNIT

CROSS REFERENCE TO RELATED APPLICATIONS

This application is the US National Stage of International Application No. PCT/EP2020/074925 filed 7 Sep. 2020, and claims the benefit thereof. The International Application claims the benefit of European Application No. EP19201068 filed 2 Oct. 2019. All of the applications are incorporated by reference herein in their entirety.

FIELD OF INVENTION

The invention relates to an anchoring unit, a method for fastening a system with an anchoring unit and a system unit with an anchoring unit.

BACKGROUND OF INVENTION

The electrical insulation of a system from the ground is relevant to the safety of many system types, in particular for switch cabinets, fuel cells or electrolysis systems. Feet are known, which comprise threaded sheaths which are cast into an electrically insulating resin. Although these feet are electrically insulating, a short circuit via the feet is possible, in particular via a flow of water. It is therefore disadvantageously impossible to safely rule out a short circuit.

The known feet are furthermore stable for pressure loads on the foot itself. However, they are disadvantageously not stable for tensile loads, which can act on the foot in particular in the event of oscillating system parts or vibrations of the system.

SUMMARY OF INVENTION

An object of the invention, therefore, is to specify an anchoring unit, which is electrically insulated and withstands tensile loads. A method for fastening a system with an anchoring unit and a system with an anchoring unit shall furthermore be specified.

The object is achieved with an anchoring unit, a method for fastening a system, and a system as claimed.

An inventive anchoring unit for a system comprises at least one first insulation layer and at least one second insulation layer. It furthermore comprises a base layer for mechanically stabilizing the insulation layers, wherein the base layer is arranged between the first and second insulation layer. It also comprises at least two screws, wherein the screws are aligned in opposite directions, wherein a first screw is suitable for anchoring to the system and a second screw is suitable for anchoring to an anchor object. A first screw shaft of the first screw and/or a second screw shaft of the second screw are at least partially surrounded by an electrically insulating insulation sleeve.

The inventive method for fastening a system to an anchor object comprises a plurality of steps. Firstly, the provision of an anchoring unit with at least one first insulation layer, a second insulation layer and with a base layer for mechanically stabilizing the insulation layers takes place. The base layer is arranged between the first insulation layer and the second insulation layer. The anchoring unit furthermore comprises two screws, wherein the screws are aligned in opposite directions. A first screw is suitable for fastening the anchoring unit to the system. A second screw is suitable for anchoring the anchoring unit to the anchoring object. A first screw shaft of the first screw and/or a second screw shaft of the second screw are at least partially surrounded by an insulation sleeve. The anchoring unit is anchored to the anchoring object by means of the second screw. The anchoring unit is anchored to the system by means of the first screw.

An inventive system comprises an inventive anchoring unit, wherein the first screw is fixedly connected to the system and the second screw is fixedly connected to the anchor object.

An insulation layer here refers to a layer which is electrically insulating. The insulation layer can cover the entire base layer. However, it can also be arranged around the screw as a type of washer and therefore not cover the entire base layer.

The base layer comprises a mechanically stable material. It can in particular comprise electrically conductive materials, such as metals.

The arrangement of the two screws in opposite directions advantageously enables that the anchoring unit, when anchored in an anchor object, in particular in the ground, can not only withstand pressure loads, but also tensile loads, and electrical insulation of a system, in particular from the ground, is ensured. In the event of tensile loads, the first screw, which is connected to the system, is moved away from the second screw, which is connected to the anchor object. The first screw is therefore in particular pressed onto the base layer and the first insulation layer. The electrical insulation is thus advantageously also maintained under tensile loads. Oscillating movements of the system or vibrations of the system, which can be regarded as alternately occurring tensile and pressure loads, are advantageously absorbed by the anchoring unit, wherein the electrical insulation between the system and anchor object, in particular the ground, is furthermore ensured.

The first screw shaft of the first screw and/or the second screw shaft of the second screw is advantageously furthermore at least partially surrounded by an insulation sleeve. The insulation sleeve can already be arranged around the screw shaft before the introduction into the base layer and the insulation layer. It is likewise possible that the insulation sleeve is arranged in a cutout in the base layer and the first insulation layer and the screw is subsequently screwed into the insulation sleeve. An additional insulation sleeve also insulates the screw electrically from the base layer. Short circuits are therefore advantageously prevented. This advantageously increases the safety of the electrical insulation.

The anchor object can be in particular the ground, walls or a mechanically stable component. The screw shaft refers both to the screw thread of a screw and a smooth shaft part here.

In an advantageous configuration and development of the invention, a second screw shaft of the second screw is at least partially arranged in the second insulation layer and/or a first screw shaft of the first screw is arranged in the first insulation layer. Under tensile loads, the second screw is fastened to the base layer and the second insulation layer with an increased load. Electrical insulation of the system then advantageously takes place by means of the first insulation layer and the second insulation layer. In other words, both screws must not be in contact with the base layer. To prevent leakage currents, a clearance, in particular an air-filled clearance, should be present between the base layer and the screw. This enables even greater safety of the electrical insulation, in particular also in the event of tensile loads, in the event of vibrations and/or oscillations.

In a further advantageous configuration and development of the invention, at least the first insulation layer and the base layer are surrounded by an elastic electrically insulating water-tight cover. It is particularly advantageous if the entire anchoring unit is surrounded by an electrically insulating water-tight cover. Water which flows over the anchoring unit is therefore advantageously prevented from penetrating into the anchoring unit and being able to result in short circuits there. The water-tight cover advantageously furthermore ensures that an electrical short-circuit to ground is prevented.

In a further advantageous configuration and development of the invention, the first and/or second insulation layer is configured as an elastic electrically insulating water-tight cover. The base layer is therefore advantageously only surrounded by one layer. This advantageously saves on material.

In a further advantageous configuration and development of the invention, an insulating washer is arranged between the first screw head and the base layer and/or between the second screw head and the base layer. This insulating washer can be configured in particular as a flat washer. The screw is advantageously electrically insulated at the contact point with the base layer by means of the washer. The presence of a short circuit within the anchoring unit is therefore prevented.

In a further advantageous configuration and development of the invention, the first screw is in direct contact with the second insulation layer. In other words, the first screw and the second insulation layer are touching one another. In this embodiment, the first screw head is in particular electrically insulated from the base layer via the second insulation layer. Short circuits within the anchoring unit are thus advantageously prevented.

In a further advantageous configuration and development of the invention, the screw shaft of the second screw is arranged in an elastic sleeve. In other words, the second screw shaft is surrounded by an elastic sleeve. This elastic sleeve can advantageously compensate a thermal expansion of the object to be fastened, in particular an electrolysis module.

In a further advantageous configuration and development of the invention, the base layer has a first cutout for countersinking the screw head of the first screw and/or a second cutout, which is arranged offset from the first cutout on the opposite side of the base layer for the purpose of countersinking the screw head of the second screw. There are therefore advantageously no components projecting from the base layer. This advantageously facilitates the assembly of the anchoring unit.

In a further advantageous configuration and development of the invention, the anchoring unit comprises two first screws and two second screws. The system can therefore advantageously be fastened to the anchor object at two bearing points. The mechanical stability, in particular with regard to tensile loads, oscillations and vibrations, is therefore advantageously further increased.

In a further advantageous configuration and development of the invention, the two first screws and the two second screws are arranged mirror symmetrically with respect to an axis of symmetry extending vertically to the anchor object. The weight of the system is thus advantageously evenly distributed to the two second screws, which are connected to the anchor object. The distribution of the weight of the system via the first screw also takes place evenly. The components are therefore advantageously evenly loaded, which increases their useful life.

BRIEF DESCRIPTION OF THE DRAWINGS

The above-described properties, features and advantages of this invention and the way in which they are achieved will become more clearly and obviously comprehensible in association with the following description of the exemplary embodiments, which are explained in more detail in association with the drawings, in which.

DETAILED DESCRIPTION OF INVENTION

Figure 1:
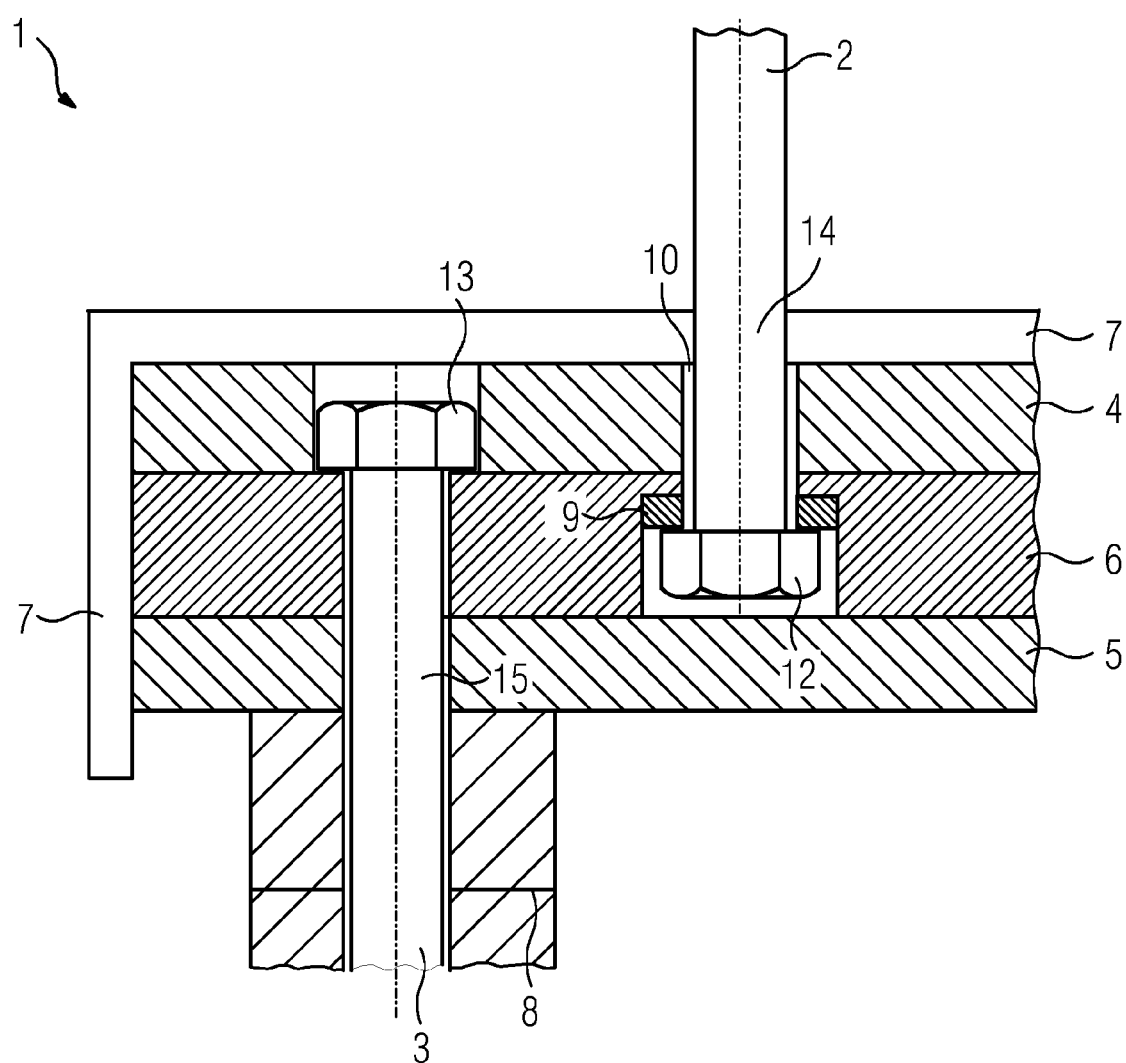
FIG. 1 shows an anchoring unit with two screws, two insulation layers, a base layer and an insulation sleeve.

FIG. 1 shows an anchoring unit 1 with a first insulation layer 4 and a second insulation layer 5. A base layer 6 is arranged between the first insulation layer 4 and the second insulation layer 5. A first screw 2 is fastened to the base layer 6. The first screw 2 with a first screw head 12 penetrates the first insulation layer 4. It is therefore at least partially arranged in the first insulation layer 4. A second screw 3 with a second screw head 13 is likewise fastened to the base layer 6. The second screw 3 is fastened to the base layer 6 in the opposite direction to the first screw 2. The second screw 3 penetrates the second insulation layer 5. The second screw 3 is therefore at least partially arranged in the second insulation layer 5.

The first insulation layer 4, the base layer 6 and the second insulation layer 5 are surrounded by a cover 7. The second screw 3 is fixedly connected to an anchor object 8. The anchor object 8 is typically the ground. However, it is likewise possible that the anchor object 8 may be a wall or a fixed component. The first screw 2 is surrounded by an electrical insulation sleeve 10 in the region of the first insulation layer 4 and the base layer 6. The screw head 12 of the first screw 2 is furthermore separated from the base layer 6 by an insulating flat washer 9. Electrical insulation of the first screw 2 from the second screw 3 therefore advantageously takes place if the base layer 6 is conductive. The first screw 2 in this exemplary embodiment is countersunk in a depression in the base layer 6.

The insulation sleeve 10 can firstly be introduced into a cutout in the insulation layers and the base layer 6. The screw can subsequently be screwed into the insulation sleeve 10. It is alternatively conceivable that the screw 2 is firstly inserted into the insulation sleeve 10 and subsequently pushed through the base layer 6 and the first insulation layer 4.

An insulating flat washer 9 is arranged between the screw head 12 of the first screw 2 and the base layer 6. This flat washer prevents contact between the screw head 12 and the base layer 6. The first screw head 12 has a diameter which is smaller than the depression in the base layer 6. In other words, an electrically insulating air space is present between the first screw head 12 and the base layer. Electrical insulation of the first screw from the second screw is therefore advantageously ensured.

To ensure electrical insulation within the anchoring unit, it can be sufficient for only one of the screws to be arranged in an insulation layer. In particular, it is possible for only the first screw 2 to be arranged in the first insulation layer 4 and the insulation sleeve 10. The first and/or second insulation layer 4, 5 can furthermore be designed as a washer around the screw.

The cover 7 is water-tight and electrically insulated. In this exemplary embodiment, the first insulation layer 4 has cutouts at the point at which the screw head 12 of the first screw 2 dips into the insulation layer 4. The cover 7 can therefore advantageously cover, and therefore likewise electrically insulate, the entire screw head 12. Both the screw shaft 14 of the first screw 2 and the screw shaft 15 of the second screw 3 are at least partially surrounded by an insulation layer. The first screw 2 is thus advantageously electrically insulated from the second screw 3. The cover 7, which is water-tight and electrically insulating, advantageously prevents water from penetrating into the anchoring unit 1, whereby short circuits are prevented.

The screws typically comprise materials consisting of metal. The cover in particular comprises materials which have rubber-elastic properties. These may be in particular acrylonitrile butadiene rubber (NBR), ethylene propylene diene monomer rubber (EPDM) or fluororubber (FPM). The first insulation layer 4 and the second insulation layer 5 in particular comprise materials such as thermosetting plastics or hard paper materials. The base layer 6 in particular comprises materials such as metals, which have a high strength and resilience.

Only half of the anchoring unit 1 is illustrated in FIG. 1. The axis of mirror symmetry shows that the anchoring unit 1 has two first screws 2 and two second screws 3 in each case. The overall construction is made clear in FIG. 2.

Figure 2:
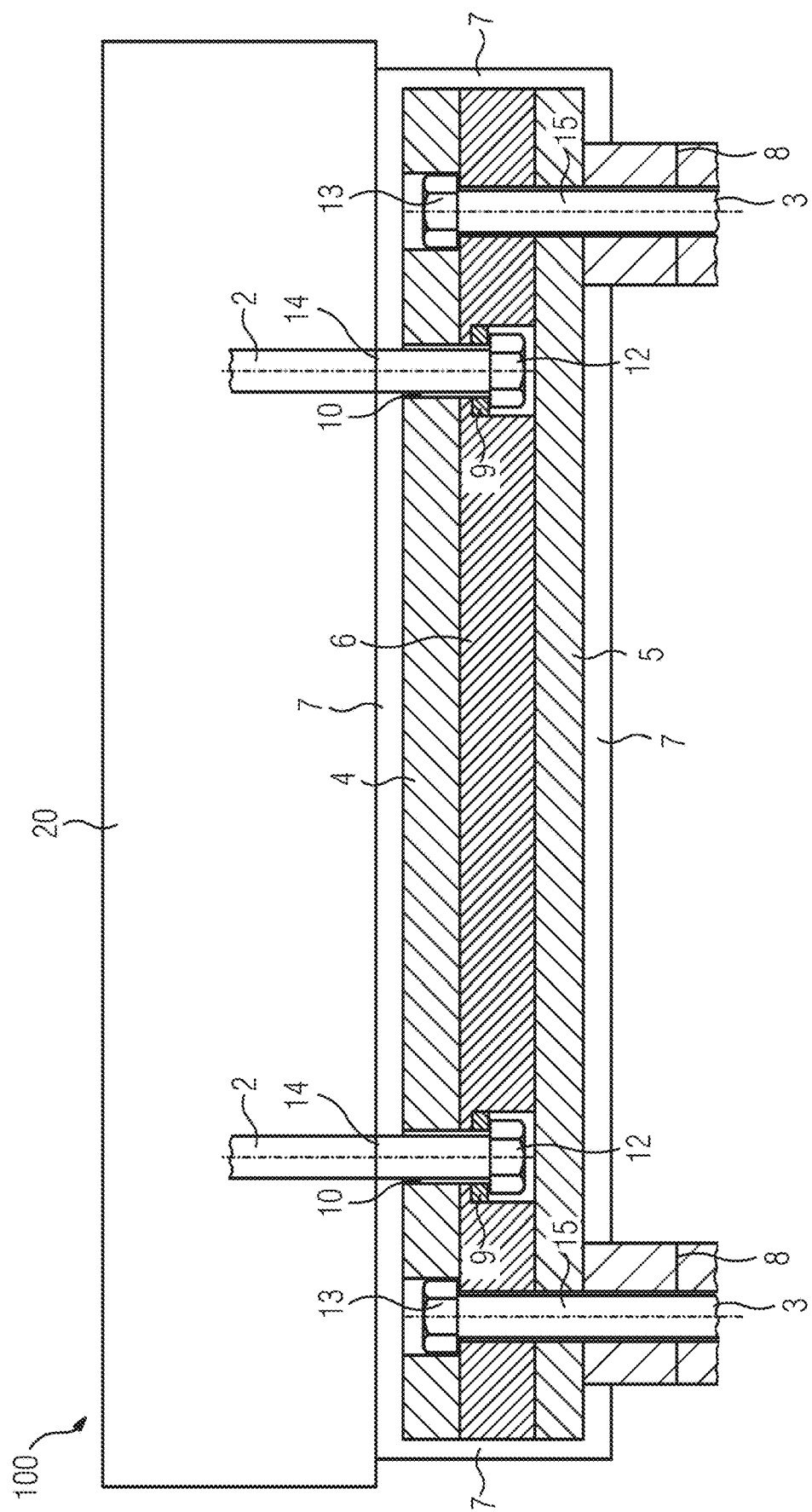
FIG. 2 shows a system with an anchoring unit and an electrolysis module.

FIG. 2 shows a system unit 100 with an anchoring unit 1 and an electrolysis module 20 as a system. The construction of the anchoring unit 1 corresponds to the construction of the exemplary embodiment of FIG. 1. The anchoring unit 1 here is fixedly connected to the ground as an anchor object 8. The two first screws 2 are fixedly connected to the electrolysis module 20. An electrolysis module 20 is typically connected to two anchoring units. In the event that the electrolysis module 20 applies tensile loads to the anchoring unit 1, in particular due to oscillations or vibrations, electrical insulation through the anchoring unit to the ground is advantageously ensured. In the event that water escapes from an electrolysis module 20, a short circuit via the anchoring unit 1 can also be prevented owing to the arrangement of the insulation layers, the cover and the screws.

Although the invention has been described and illustrated in greater detail by way of the preferred exemplary embodiment, the invention is not restricted by the disclosed examples and other variations may also be derived therefrom by a person skilled in the art without departing from the scope of protection of the invention.

LIST OF REFERENCE SIGNS

1 Anchoring unit
2 First screw
3 Second screw
4 First insulation layer
5 Second insulation layer
6 Base layer
7 Cover
8 Anchor object
9 Insulating flat washer
10 Insulation sleeve
12 First screw head
13 Second screw head
14 First screw shaft
15 Second screw shaft
20 Electrolyzer
100 System

The invention claimed is:

1. An anchoring unit for a system, comprising:
at least one first insulation layer and at least one second insulation layer,
a base layer for mechanically stabilizing the first and second insulation layers, wherein the base layer is arranged between the first insulation layer and second insulation layer,
at least two screws, wherein the screws are aligned in opposite directions,
wherein a first screw is suitable for anchoring to the system and a second screw is suitable for anchoring to an anchor object,
wherein a first screw shaft of the first screw and/or a second screw shaft of the second screw is at least partially surrounded by an electrically insulating insulation sleeve, and
wherein at least the first insulation layer and the base layer are surrounded by an elastic electrically insulating water-tight cover.

2. The anchoring unit as claimed in claim 1, wherein the second screw shaft of the second screw is at least partially arranged in the second insulation layer.

3. The anchoring unit as claimed in claim 1, wherein the first screw shaft of the first screw is at least partially arranged in the first insulation layer.

4. The anchoring unit as claimed in claim 1, wherein an insulating washer is arranged between a first screw head and the base layer and/or between a second screw head and the base layer.

5. The anchoring unit as claimed in claim 1, wherein the first screw is in direct contact with the second insulation layer.

6. The anchoring unit as claimed in claim 1, wherein the base layer has a first cutout for countersinking a screw head of the first screw and/or a second cutout, which is arranged offset from the first cutout on an opposite side of the base layer, for countersinking a screw head of the second screw.

7. The anchoring unit as claimed in claim 1, wherein the second screw shaft of the second screw is arranged in an elastic sleeve.

8. The anchoring unit as claimed in claim 1, wherein the anchoring unit has two first screws and two second screws.

9. The anchoring unit as claimed in claim 8, wherein the two first screws and the two second screws are arranged mirror-symmetrically with respect to an axis of symmetry extending vertically to the base layer.

10. A system unit comprising:
an anchoring unit as claimed in claim 1,
wherein the first screw is connected to the system and the second screw is connected to the anchor object.

11. A method for fastening a system to an anchor object, comprising:
providing an anchoring unit with at least one first insulation layer and at least one second insulation layer, a base layer for mechanically stabilizing the first and second insulation layers, wherein the base layer is arranged between the first insulation layer and second insulation layer, with at least two screws, wherein the screws are aligned in opposite directions to one another, wherein a first screw is suitable for anchoring to the system and a second screw is suitable for anchoring to an anchor object, wherein a first screw shaft of the first screw and/or a second screw shaft of the second screw is at least partially surrounded by an insulation sleeve, and wherein at least the first insulation layer and the base layer are surrounded by an elastic electrically insulating water-tight cover;

fastening the system to the anchoring unit with the first screw; and fastening the anchoring unit to the anchor object with the second screw.

12. The method as claimed in claim 11, wherein ground, a wall or a mechanically fixed component is used as the anchor object.

13. An anchoring unit for a system, comprising:

at least one first insulation layer and at least one second insulation layer, a base layer for mechanically stabilizing the first and second insulation layers, wherein the base layer is arranged between the first insulation layer and second insulation layer, at least two screws, wherein the screws are aligned in opposite directions, wherein a first screw is suitable for anchoring to the system and a second screw is suitable for anchoring to an anchor object, wherein a first screw shaft of the first screw and/or a second screw shaft of the second screw is at least partially surrounded by an electrically insulating insulation sleeve, and wherein an insulating washer is arranged between a first screw head and the base layer and/or between a second screw head and the base layer.

* * * * *